United States Patent [19]
Schwind

[11] Patent Number: 5,821,728
[45] Date of Patent: Oct. 13, 1998

[54] ARMATURE INDUCTION CHARGING OF MOVING ELECTRIC VEHICLE BATTERIES

[76] Inventor: John P. Schwind, 8806 Washington Blvd., Jessup, Md. 20794

[21] Appl. No.: 685,943

[22] Filed: Jul. 22, 1996

[51] Int. Cl.$^6$ .................................................. H01M 10/46
[52] U.S. Cl. ............................................................ 320/108
[58] Field of Search .............................. 320/2, 108, 109, 320/123, 101, DIG. 36; 191/10

[56] References Cited

U.S. PATENT DOCUMENTS

| | | | |
|---|---|---|---|
| 3,914,562 | 10/1975 | Boger | 191/10 |
| 4,007,817 | 2/1977 | Bolger, Jr. | 191/10 |
| 4,331,225 | 5/1982 | Bolger | 191/10 |
| 4,836,344 | 6/1989 | Bolger | 191/10 |
| 5,311,973 | 5/1994 | Tseng et al. | 320/2 X |
| 5,431,264 | 7/1995 | Tseng et al. | 191/10 |
| 5,573,090 | 11/1996 | Ross | 320/2 X |

*Primary Examiner*—Edward Tso

[57] ABSTRACT

Batteries of a moving electric vehicle are charged using an electromagnetic field extended along the centerline of a driving lane and a level controlled armature mounted on the underside of an electric vehicle by having the moving coils of the armature lowered to optimum proximity of the magnetic field as the moving vehicle straddles and traveress over the magnetic field. Current will be induced into the armature coils by the relative motion between the armature coils and the primary inductive coils. For billing purposes a vehicle is identified and timed as it enters and leaves the charging lane by means of a vehicle mounted bar code and scanners located at the entrance and exit of the charging lane. The billing information is relayed to a data storage and process center.

2 Claims, 2 Drawing Sheets

OS = OPEN SWITCH
CS = CLOSED SWITCH

ARMATURE INDUCTION CHARGING OF MOVING ELECTRIC VEHICLE BATTERIES

BACKGROUND OF INVENTION

1. Field of Invention

The present invention relates to charging batteries of moving electric vehicle batteries and more specifically the use of a stationary primary coil and a vehicle mounted armature for inductive charging of moving electric vehicle batteries.

2. State of the Art.

Use of electric vehicles {hereinafter referred to as EVs} especially in high density traffic areas is currently considered the solution to the air polution problems caused by internal combustion engines.

Most EVs will be used by locals or working commuters. A large number of suburbs in which commuters reside lie from forty to over one hundred miles from their respective metropolitan work areas. This results in daily round trips of from eighty to over two hundred miles for the commuter.

Due to battery discharge rates, EVs are limited to a range of approximately one hundred miles not allowing for the use of electric accesories. Means for intermediate battery charging or for charging an EV's batteries while it is in transit is necessary to effect useful applications of said vehicles under these circumstances.

Some quarters propose installing electric outlets on existing parking meters and on posts to be installed on or near parking spaces in parking lots. Others propose recharge stations to be erected near work and suburban areas.

Southern California Edison (SCE) for example is developing an EV recharging infrastructure for the Los Angeles area. By the beginning of the next decade they purport to be able to provide recharging at neighborhood and work place stations for up to one million drivers. {Washington Post, Apr. 18, 1995}.

At an average of six hours recharge time per vehicle, the SCE plan would require an undesireable six million compiled hours of charging time. Furthermore, concentration of toxic fumes being produced could be hazardous. Infrastructure costs, space requirements and vehicle down time deem the above mentioned systems economically unfeasible.

Induction charging of moving vehicles has been proposed.

U.S. Pat. No. 5,311,973 to Tsang et al discloses a method for induction charging of a moving EV's battery using means for producing a magnetic field along an extended linear distance and an induction coil mounted on a moving vehicle. Said patent proposes a stationary primary coil to be embedded in an embankment or buried underground along a highway. Said patent also relates to alternating current and/or the relative motion of the vehicle as the methods for providing the movement necessary to cause the turns of the secondary coil to cut the imaginary lines of magnetic flux produced by the primary coil in order to induce current into the secondary coil.

Lines 5 thru 18 of page 4 of said patent relate to a means to use an autopilot to control the speed and position of an EV in order to optimize the moving speed and position of the EV and the gap between the EV and the charging installations on the side of the highway.

Lines 51 thru 59 of page 2 relate to establishing a charging system in an outside lane where a toll would be collected manually in the form of cash, tokens or coupons.

Lines 59 thru 68 of page 2 and lines 1 thru 55 of page 3 and FIG. 3 relate to use of an Intelegent Highway Vehicle System, a Smart Charging System and comprehensive, telecommunication and radio network for tolling, battery management, vehicle speed and location monitoring and determining and providing electric charging patterns.

Lines 23 thru 33 of page 4 relate to a need for magnetic radiation protection for passengers and vehicular electronic equipment.

Lines 39 thru 47 of page 4 of said patent indicate that protection must be provided for vehicles not using the charging system and that warning signs and signals should be provided to alert vehicles and pedestrians that they are approaching a health hazard zone and suggests that a metal wall be installed between the charging lane and normal traffic lanes.

Induction charging of moving EVs has merit over stationary charging methods. The method disclosed in the above patent however presents several difficulties in attempting to achieve its goal, such as: 1. With a stationary secondary coil mounted rigidly on an EV, in order to achieve optimum speed and position relative to the primary coil, it is necessary to control the speed and position of the vehicle itself either by autopilot or by directing the operator to make the necessary speed and relative position adjustments. Further, the relative movement between the primary and secondary coil is controlled by the speed of the vehicle thus limiting the potential rate of induction. 2. According to the configuration proposed, a considerable distance or gap will exist between the charging EV and the primary coil. A magnetic field weakens inversly at a very high distance to strength loss ratio which could necessitate broadcasting intense magnetic radiation through the area to be served creating a high power demand and a potential health hazard area, furthermore according to said patent protective metal walls, warning signs and signals and protective coating for all vehicles must or should be provided, adding to the complexity and cost of the infrastructure and vehicles. 3. It would be difficult to designate an outside lane as a battery charging lane because most outside lanes are used for emergency, merging, or acceleration-decelaration lanes. 4. To allow for sufficient charging time, an extended linear distance of one mile is related to. Average recharging time for EV batteries ranges from three to six hours. At a traveling speed of sixty miles an hour, a one mile charging area would provide one minute of charging time, a ten mile charging area, ten minutes charging time etc., which in most cases would not suffice. Long extentions of the charging areas would be difficult to install due to existing or potential obstacles along a highway, such as entrance and exit ramps, crossroads, service stations etc. Aquisition of land, easements and rights-of-way needed to construct the charging system would be costly, time consuming and in many cases impossible. Smart cards or manual collection of coins, tokens or coupons are related to. Many metropolitan feeder roads that might use an EV charging system are not equipped with "smart systems" such as an Inteligent Highway Vehicle System {IHVS}, thus physical toll collecting would be prevelant which would cause traffic slow down and congestion which of course is undesireable.

The problems referred to in the foregoing shows the need for a better way to charge batteries of moving electric vehicles.

The present invention addresses these problems.

SUMMARY OF INVENTION

According to the present invention, batteries of a moving electric vehicle are charged using means for producing a magnetic field extended along the centerline of a driving lane of a highway and an armature mounted on the underside of a moving electric vehicle, by driving the vehicle over the magnetic field causing revolving armature coils to move within the influence of the magnetic field. Furthermore in accordance with the present invention, an apparatus for charging batteries of an electric vehicle equipped with an armature while the vehicle is moving includes means for automatic on and off switching of short sections of said magnetic field source, means for activating long sections of said magnetic field, means for inducing current into vehicle mounted armature coils, means for identifying the vehicle as it enters and exits the charging area for billing purposes, and means for lowering said armature to optimum proximity of said magnetic field. Means for producing a magnetic field may be a series of primary inductive coils controlled by sensor activated switches, and means for identifying a vehicle for billing may be a vehicle mounted bar code read by scanners located at the entrance and exit stations of a charging lane, said scanners having a designation number or code and information relay capabilities.

BRIEF DESCRIPTION OF DRAWINGS

FIG. 2a shows an array of armature coils deployed in an oval configuration, coil mounting and drive belt, drive and tension pulleys, and an antimagnetic shield.

DETAILED DESCRIPTION OF THE PREFERRED EMBODIMENTS

Producing electric current by moving a coil through a magnetic field is a well known phenomenon. In practice, as the armature of a dynamo or generator revolves, its coils cut the magnetic lines of flux of the wound field magnets that surround the armature, the current induced into the armature coils is collected by a ring or commutator and brushes. Magnetos produce electric current using permanent magnets in place of wound field windings.

In the present invention the magnetic field is produced by a series of inductive coils installed for a linear distance along the center line of a driving lane, whereas an armature is mounted on a level controller on the underside of an electric vehicle. As the vehicle traverses over the magnetic strip, the level controller lowers the armature to optimum proximity of the inductive coils, current is induced into the moving coils of the armature caused by the relative motion of the revolving armature coils to the inductive coils producing an electromotive force which is used to charge the vehicle batteries. The rate of induction may be controlled by varying the rpm of the armature. Direct current may be used.

Figure 6:
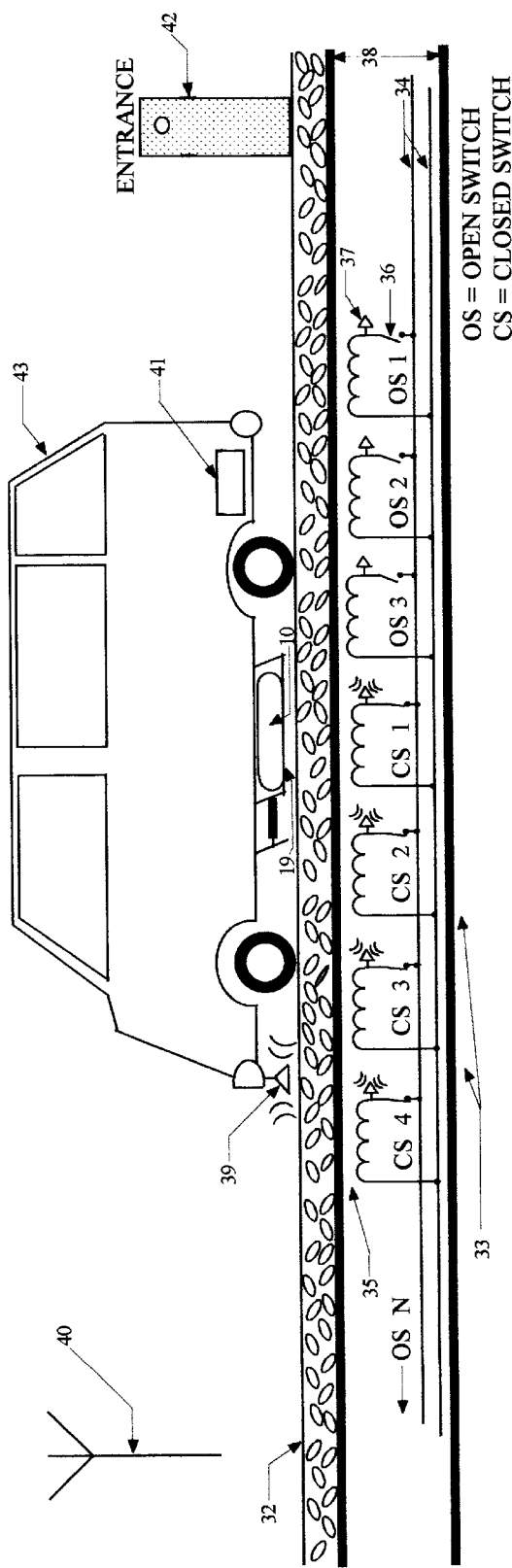
FIG. 6 is a simple diagram illustrating the physical arrangements of a certain case of the devices in FIGS. 2 thru 4, also a bar code decal or plate, and an entrance bar code scanner.

The aforementioned arrangement is illustrated in FIG. 6. Means for producing a magnetic field, such as an electromagnetic strip 33 (hereinafter referred to as EMS) comprising a series of inductive coils 35, switches 36, and sensors 37 enveloped in a transmissive conduit 38 may be extended over a long distance, for example ten to eighty or more miles along the centerline of a roadway 32. Means for supplying power to the inductive coils may be power lines 34, switches 36 and switch activator sensors 37 enveloped in said conduit or in a seperate conduit installed ajacent to the EMS and connected to the inductive coils. Means for transducing the magnetomotive force surrounding the EMS 33 to electromotive force may be moving coils of an armature 10. Means for optimum horizontal positioning of armature 10 may be a movable armature mounting frame 19 attached to pivotal lowering arms 20, connected to the level control arm 24 by shock absorber 25, and operated by a servo mechanism comprising a magnetic sensory element 31, amplifier, servo feedback input and output element 29, servo motor 28, and worm gear 26. Means for controlling the rpm of the armature may be a servo mechanism sensitive to voltage differential, comprising a voltage differential sensor controlled potentiometer 13, a variable speed servo motor 11 connected to armature 10 by drive shaft 12, means for protecting the armature from physical road hazards while in a lowered position may be a shield 23 attached to operating lever 24 mounted in an advanced position of and fastened to lowering bar 20 with shock absorber 25. Means for isolating the idle upper coils of the armature as said coils are in their return mode may be an antimagnetic sheild 5. Means for operating the field winding switches may be high pitch sound or other type wave form transmitted from vehicle 43 by transmitter antenna 39 and received by sensors 37 located adjacent to switches 36. Means for identifying and timing an EV using the charging utility may be a bar code decal or plate 41 and entrance and exit station scanners 42, means for activating long sections of EMS 33 may be wave form transmitter antennas 40 located at intervals along roadway 32.

A charging lane may be any lane of a highway similar to an High Occupancy Vehicle (HOV) lane and may have entrance an exit lanes at intervals of say ten miles, each monitered by bar code scanners 42.

Preferably, the EV is provided with a voltage indicator to continually display the state of charge of the EV's batteries. Subsequent to opting to charge ones vehicle batteries, an operator may opt to enter said EV into a charging lane through the nearest entrance. As said EV enters and exits said lane a bar code scanner apparatus may identify said EV, this data plus the scanner designation number, date, and time of day may be relayed to a data collection and process center for billing purposes.

Figure 1:
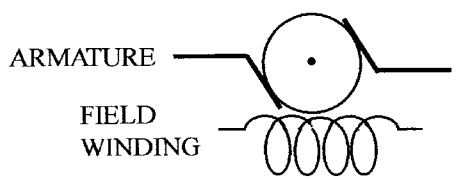
FIG. 1 is a simple diagram illustrating an inductive coil and armature arrangement.
Figure 2A:
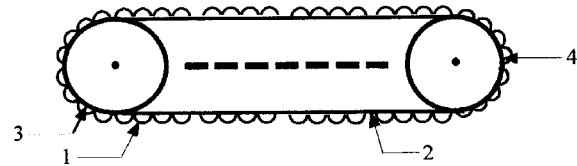
FIGS. 2a,b, & c are simple diagrams of components comprised in one embodiment of the invention showing one possible means for constructing an oval shaped armature.
Figure 2B:
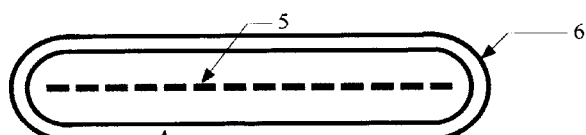
FIG. 2b shows one of two armature brush raceways with a flush mounted conductor strip.
Figure 2C:
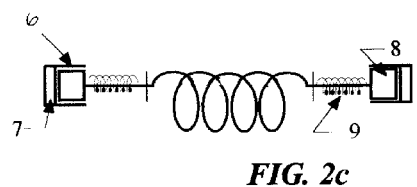
FIG. 2c shows a typical armature coil with spring loaded brushes and a section view of the brush raceways and conductor strips.
Figure 3:
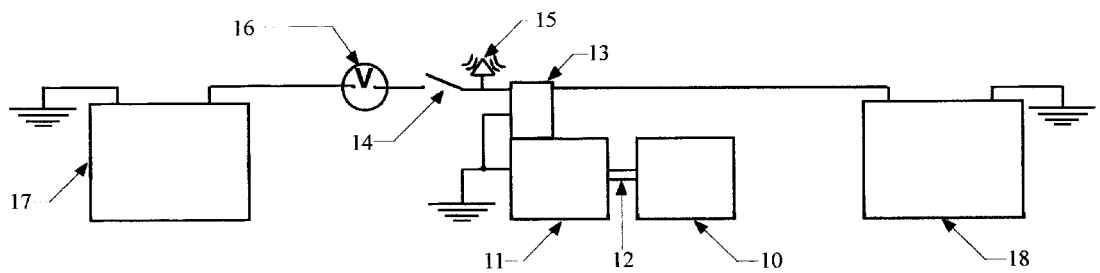
FIG. 3 is a block diagram of an armature drive and control device comprising a servo mechanism, servo feedback circuit, servo armature drive motor, servo activator switch, servo switch sensor, voltmeter, discharged batteries and servo power source battery.
Figure 4:
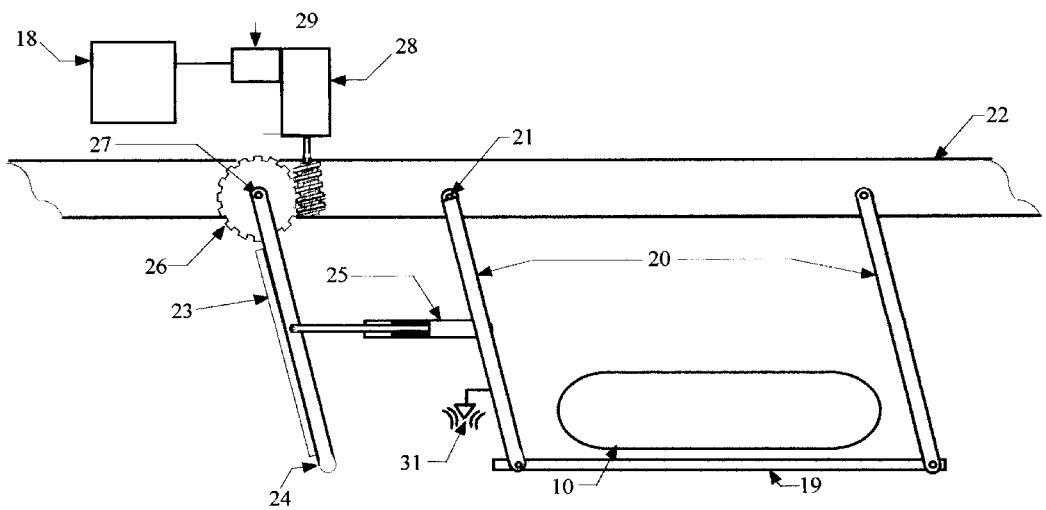
FIG. 4 is a simple diagram showing an armature level control apparatus mounted on the underside of an EV frame comprising an armature mounting frame, lowering arms, level control servo mechanism, worm gear, level control arm, armature protection shield, shock absorber and passenger shield.
Figure 5:
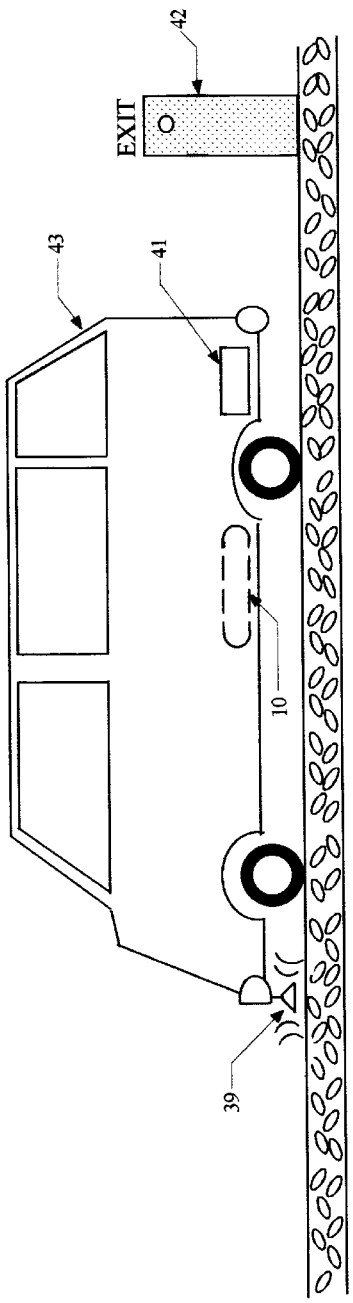
FIG. 5 is a simple diagram illustrating an EV in a non charging mode, showing the retracted armature position, transmitter, bar code decal or plate, and exit bar code scanner.

Referring to FIG. 6, As EV 43 straddles and traverses EMS 33, sensors 37 recieving signals from transmitter 39 will cause switches 36 to close activating short sections of EMS 33 in the area of EV 43, vehicle mounted electromagnetic sensors 31 (FIG. 4) and 15 (FIG. 3) will activate level controller servo mechanism 29 (FIG. 4) and armature servo mechanism 13 (FIG. 3), lowering armature 10 to its operating level and placing armature motor 11 in a speed control mode. Magnetic field sensor 31 (FIG. 4) will relay the magnetic field strength to level control servo mechanism 29 which will cause reversible servo motor 11 to place armature 10 in the strongest area of said magnetic field. FIG. 6 shows one case of said charging system in an operating mode with CS 1 thru 4 closed and OS 1 thru N open. Feedback information for controlling the armature servo mechanism may be voltage differential of the discharging battery or batteries 17 or output amperage of armature 10. Power source for drive motor 11 may be charged battery 18. Preferably EV 43 will be provided with amperage and voltage regulators to further adapt the voltage and amperage patterns to the requirements of its batteries 17 according to their state of charge In a preferred embodiment of said charging system armature 10 will be oval in shape and comprise a belt or chain 2 for mounting and propelling coils 1, drive and tensions pulleys or sprockets 3 and 4 for propelling drive belt or chain 2, raceways 6 and conductor strips 7 for guiding and contacting brushes 9. Deploying the array of coils 1 in an oval configuration and turning the armature counter to the vehicle's forward motion will facilitate constant exposing several moving armature coils to said magnetic field effecting a high rate of induction. Further, use of direct current, through the inductive coils is preferred obviating use of devices such as commutators, switches or rectifiers to produce direct current needed for charging said batteries.

In another preferred embodiment of said charging apparatus, means for protecting armature 10 from potential foreign objects on a roadway while in its lowered position may be shield 23 mounted on level control arm 24 in advance of and connected to lowering arm 20 by shock absorber 25 and extended downward to the same level of armature mounting frame 19. In a case where shield 23 may strike a foreign object, the resulting force will move the level control arm 20 rearward and upward via shock absorber 25 allowing said object to pass under frame 19. Means for protecting worm gear 26 and servo motor 28 may be a ratchetted safety release hub installed between shaft 27 and worm gear 26.

In another preferred embodiment of the present invention, a means for producing an electromagnetic field extended along a centerline of a driving lane may be an electromagnetic strip comprising a series of inductive coils 35 and power lines 34 manfactured of superconductor material, solid state switches and sensors 36 and 37 enveloped in a flexible transmissive conduit 38. Material used for the manfucture of said field windings and power lines for example may be yytrium barium copper oxide capable of carrying one million amps per one square centimeter cross section of conductor. A low cost compound or element such as nitrogen may be used for temperature control within said conduit. Low resistive qualities and high amperage capabilities of superconductors will enhance the efficacy of said EMS and greatly reduce power costs. Preferrably the flexibility of said EMS will be sufficient to permit its handling and transportation by and on standard cable spools and trucks. It is further preferred that said EMS be fabricated in such lengths, say one hundred feet, and equipped with quick couplings to facilitate ease of installation, replacement and repair operations.

As shown and described above the current invention provides a better, more effective and safe method for charging moving EV batteries than the current state of art by providing an isolated magnetic field extended for a long distance along the centerline of a roadway, automatically localized and efficiently transduced to electromotive force and adapted to the intrinsic electrical system of an EV.

While preferred embodiments of the present invention have been shown and described herein, it is intended that such embodiments are provided for illustration and example only. It will be obvious to those skilled in the art that numerous modifications, substitutions, and variations may be made without changing the spirit and scope of the invention herein. Accordingly, it is intended that the invention be limited only by the spirit and scope of the appended claims.

What is claimed is:

1. An apparatus for charging batteries of a moving electric vehicle comprising:

(A) an electromagnetic strip means for producing a magnetic field along a centerline of a roadway, comprising a series of inductive coils, power supply line, switches, and sensors;

(B) an armature and armature drive motor servo mechanism for transducing the magnetomotive force of said magnetic field to electromotive force, producing electric current for charging said batteries;

(C) a level controller and level controller servo mechanism means for positioning said armature in optimum proximity to said magnetic field wherein
(C1) the level controller including a road hazard protection means comprising:
(C1-1) an armature mounting plate;
(C1-2) lowering arms means for manipulating the mounting plate;
(C1-3) a level control arm and a level control arm shield; a shock absorber means for connecting said level control arm to said lowering arms means for protecting the armature mounting plate and the armature from said hazards
(C1-4) a worm gear means for operating the lowering arms means;
(C2) the level controller servo mechanism comprising:
(C2-1) a magnetic field intensity sensor, a potentiometer, and a reversible servo motor for driving said worm gear means for maintaining optimum proximity of said armature to said magnetic field;

(D) a ratchetted safety release hub means for emergency disengagement of said worm gear means from a servo motor shaft;

(E) an antimagnetic shield means for protection of electric vehicle passengers and electronic equipment;

(F) means for identifying, timing and billing said vehicle for battery charging service.

2. The apparatus for charging batteries of a moving electric vehicle as described in claim 1 wherein said means for identifying, timing and billing said electric vehicle is provided comprising:

a vehicle mounted bar code;

entrance and exit scanners;

data storage and process center; and means for transmitting information from said scanners to said data center.

* * * * *